United States Patent

Du

[19]

[11] Patent Number: 6,081,060

[45] Date of Patent: Jun. 27, 2000

[54] MOTOR ASSEMBLY FOR POWER TOOLS

[75] Inventor: Hung T. Du, Reisterstown, Md.

[73] Assignee: Black & Decker Inc., Newark, Del.

[21] Appl. No.: 09/366,909

[22] Filed: Aug. 4, 1999

Related U.S. Application Data

[63] Continuation-in-part of application No. 09/293,242, Apr. 16, 1999.

[51] Int. Cl.[7] .......................... H01R 39/20; H01R 39/24; H02K 13/00
[52] U.S. Cl. .......................... 310/252; 310/233; 310/251
[58] Field of Search ................................. 310/251, 233, 310/235, 236, 252, 253

[56] References Cited

U.S. PATENT DOCUMENTS

| | | | |
|---|---|---|---|
| 4,799,957 | 1/1989 | Vogel | 75/243 |
| 5,304,417 | 4/1994 | Zurecki et al. | 428/336 |
| 5,352,523 | 10/1994 | Zurecki et al. | 428/408 |
| 5,657,842 | 8/1997 | Krenkel et al. | 310/251 |
| 5,825,114 | 10/1998 | Mukai | 310/251 |
| 5,855,955 | 1/1999 | Claar et al. | 427/248.1 |
| 5,882,561 | 3/1999 | Barsoum et al. | 264/65 |

FOREIGN PATENT DOCUMENTS 11-82492  3/1999  Japan.

OTHER PUBLICATIONS

Synthesis and Characterization of a Remarkable Ceramic: $Ti_3SiC_2$, by Michael W. Barsoum and Tamer El–Raghy, Communications of the American Ceramic Society (vol. 79, No. 7) pp. 1953–1956 Jan. 1996.

*Primary Examiner*—Clayton LaBalle
*Attorney, Agent, or Firm*—Harness, Dickey & Pierce, P.L.C.

[57] ABSTRACT

A power tool has an electric motor with a stator assembly and an armature rotatable within the stator assembly. A commutator is rotatable with the armature and is connected to the armature via a shaft. The commutator has an outer layer formed from a titanium graphite material. Brushes are associated with the commutator and are held in an end plate. The brushes are formed from a titanium graphite material.

8 Claims, 1 Drawing Sheet

MOTOR ASSEMBLY FOR POWER TOOLS

CROSS-REFERENCE TO RELATED APPLICATION

This application is a continuation-in-part application of U.S. application Ser. No. 09/293,242 filed Apr. 16, 1999 entitled MOTOR ASSEMBLY FOR POWER TOOLS, the specification and drawings are herein expressly incorporated by reference.

BACKGROUND AND SUMMARY OF THE INVENTION

The present invention relates to power tools and, more particularly, to small electric DC motors utilized in power tools with commutators and brushes formed from a titanium graphite material.

Power tools are utilized by professional tradesmen as well as weekend do-it-yourselfers. All power tools utilize electric motors which provide the desired output for the tool. Ordinarily, electric motors have a life expectancy around one hundred fifty (150) hours before the brushes and commutator require maintenance, replacement or repair.

Brushes which are currently used in electric motors are formed from a copper graphite material. These brushes ordinarily include thirty to forty (30–40%) percent of copper by weight and are satisfactory for their intended purpose. The copper commutators, likewise, are oxygen free high conductive copper with 10–25 ounces of silver per ton of copper in order to provide a reasonable motor life. Ordinarily, the commutator is designed so that it will withstand two sets of brushes before it is worn and requires replacement. While these commutators work satisfactorily for their intended purpose, designers are striving to improve both the brushes and the commutator wear life.

Accordingly, it is an object of the present invention to provide an electric motor which has an extended life. The electric motor within the power tool provides the art with brushes as well as a commutator which are manufactured from a titanium graphite material. Preferably, the titanium graphite material is a titanium silicon graphite which provides a self-lubricating effect while maintaining a long service life and outstanding electrical properties.

In accordance with a first aspect of the invention, an electric DC motor comprises a stator assembly and an armature rotatable within the stator assembly. A commutator is rotatable with the armature and is connected to the armature via a shaft. The commutator has an outer surface layer formed of a titanium graphite material. Brushes are associated with the commutator. The brushes are held in an end plate. The brushes are likewise formed from a titanium graphite material. The titanium graphite material includes titanium, silicon and graphite. Preferably, the material is $Ti_3SiC_2$. Generally, the titanium graphite material is self-lubricating.

In accordance with a second embodiment of the invention, a power tool is provided with an electric motor. The electric motor includes a stator assembly and an armature rotatable within the stator assembly. A commutator is rotatable with the armature and is connected to the armature via a shaft. The commutator has an outer surface layer formed of a titanium graphite material. Brushes are associated with the commutator and are held by an end plate. The brushes are also formed from a titanium graphite material. The titanium graphite material includes titanium, silicon and graphite. The preferred material is $Ti_3SiC_2$. The titanium graphite material is preferably self-lubricating.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENT

Figure 1:
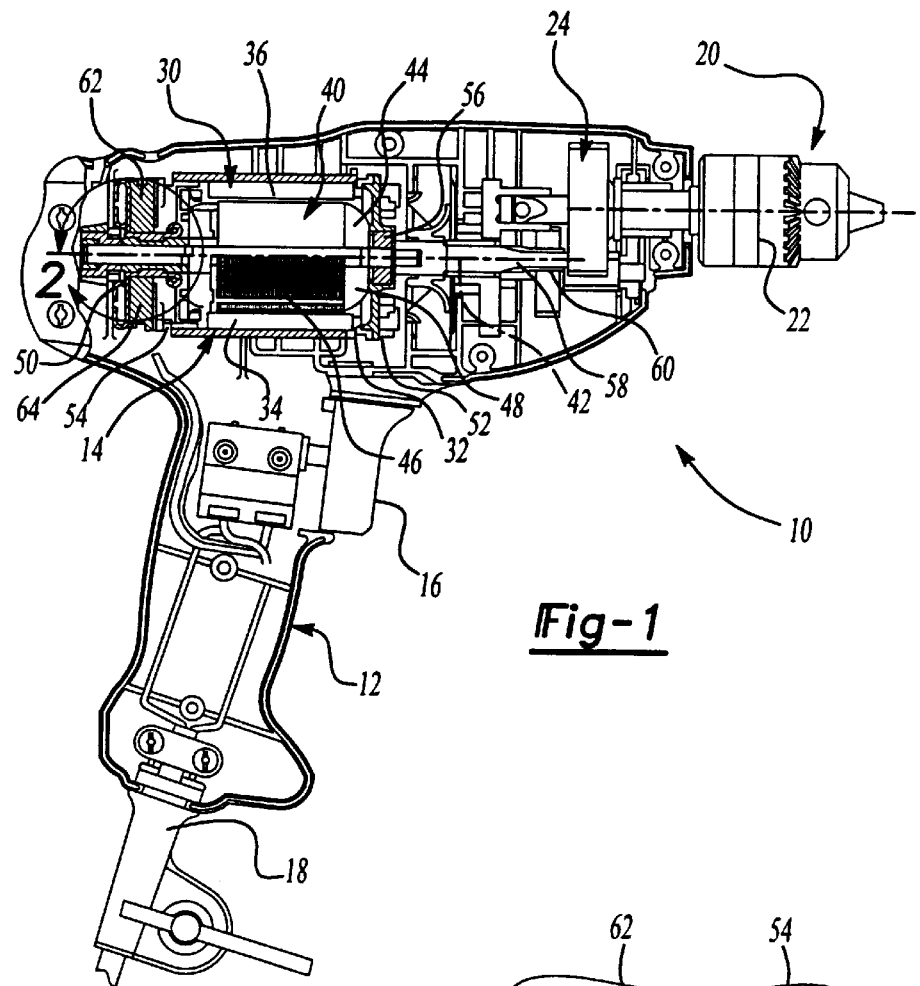
FIG. 1 is a cross-section view of a power tool in accordance with the present invention.
Figure 2:
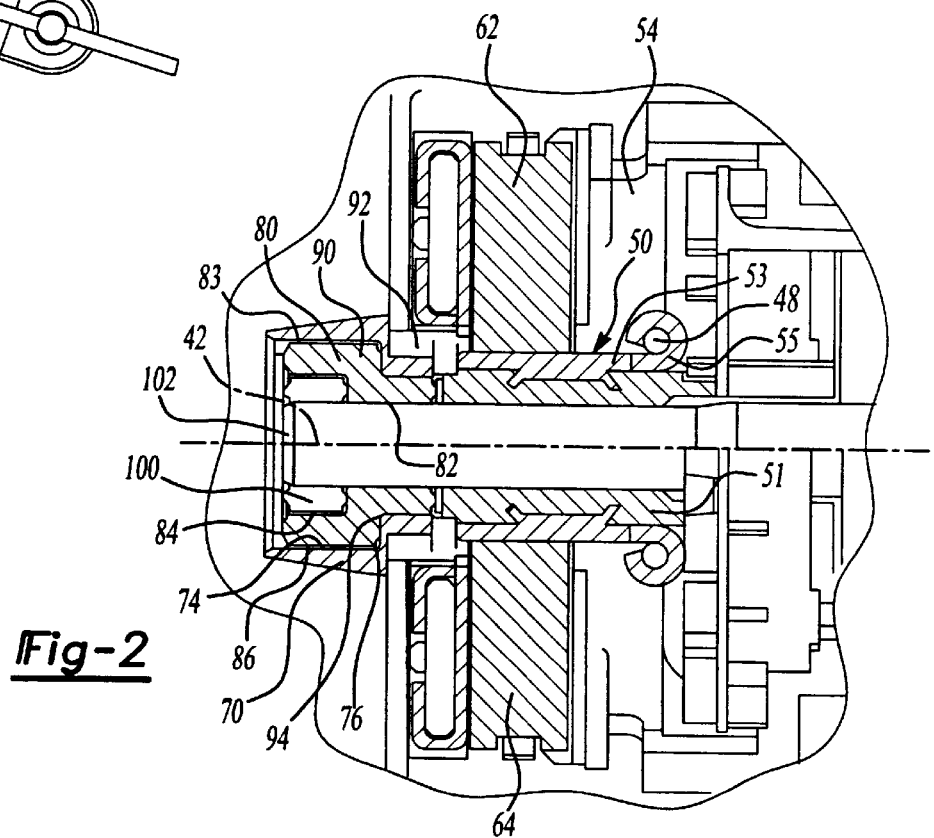
FIG. 2 is an enlarged cross-section view of FIG. 1 within circle II.

Turning to FIG. 1, a power tool in accordance with the present invention is illustrated and designated with the reference numeral 10. The power tool is illustrated as a drill; however, any type of power tool such as a screwdriver, sander, rotary tool, clippers, saw or the like which utilize an electrical motor may use the motor of the present invention. The power tool 10 includes a housing 12 which surrounds a motor 14. An activation member 16 is coupled with the motor 14 as well as with a power source 18. The power source 18 may be a battery (DC current) or the power tool may have a power cord (AC current) as shown. The motor 14 is also coupled with an output 20 which may include a chuck 22 and a transmission 24 to retain a tool (not shown).

The motor 14 includes a stator assembly 30 which includes a housing 32 and magnets 34 and 36. An armature 40 includes a shaft 42, a rotor 44 with plates 46 and windings 48, as well as a commutator 50 coupled onto the shaft 42. The motor also includes end plates 52 and 54. End plate 52 includes a bearing 56 which balances one end of the shaft 58 onto the shaft which is coupled with a power takeoff 60.

The end cap 54 includes brushes 62 and 64 which are associated with the commutator 50. The end cap 54 includes a unitary bearing housing 70. The bearing housing 70 defines an overall cylindrical cavity 74. The cavity includes a stepped shoulder 76. The bearing housing 70 houses a bearing 80.

The commutator 50 includes a first annular member 51, an outer annular member 53 and a plurality of contacts 55 which are coupled with windings 48. The first annular member 51 is generally a non-conductive material such as a phenolic insulator, which is press-fit onto the shaft 42. The phenolic material which forms the ring 51 is molded inside the second annular ring 53. The end of the annular member 51 is machined finished. The second annular member 53 is a titanium graphite material which is insulated from the armature shaft by the phenolic ring 51. The titanium graphite material includes titanium, silicon and graphite. The preferred material is $Ti_3SiC_2$. This material has excellent compressive strength and electrical conductivity. The titanium graphite material is more durable than that of the prior art copper and provides a significant increase in wear resistance.

The brushes 62 and 64 are likewise manufactured from the titanium graphite material. The utilization of the silicon and graphite in the titanium graphite material provides a material which appears to be self-lubricating. Thus, the brushes and the commutator are lubricated during the rotation of the commutator in contact with the brushes 62 and 64. By having the increased strength characteristics, the brushes and commutator do not wear as quickly as the prior art copper and graphite and therefore provide significant wear resistance, increasing the overall durability and wear time of the motor.

The brushes 62 and 64 as well as the second annular member 53 may be formed from a pressed powder operation from mixtures of the titanium, carbon and silicon carbon powders. They may be molded into the desired shape so that they may be utilized in the motor as mentioned above. The titanium graphite material provides excellent electrical and thermal properties while increasing the wear of the motor. This, in turn, increases the life expectancy of the motor before requiring brush and commutator replacement or repair.

The bearing 80 has a central bore 82 which is sized to balance the armature shaft 42. The central bore 82 has an enlarged diameter portion 84 at one of its ends. A shoulder 86 is formed at the junction of the two bore portions. The bearing 80 has an outer surface 88 which is defined by a pair of concentric cylinders 90, 92. The cylinders are configured to fit within the bearing housing 70 and have shoulder 94 abut with shoulder 76 of the housing 70.

A retainer 100 is press fit onto the shaft 42. The retainer 100 is an annular member formed from a press metal material including desired lubricant properties. The retainer 100 fits within the enlarged bore portion 84 of the bearing 80. Thus, the retainer 100 and bearing 80 are flush with the end 102 of the shaft 42. The retainer 100 seats on the bearing shoulder 86 to provide registration of the bearing 80. Also, the retainer 100 provides registration for the commutator 50 as well as the rotor 44. By positioning the retainer 100 flush with the end 102 of the shaft 42 and flush with the bearing 80, the commutator 50 as well as the rotor 44 may be easily registered with respect to the shaft 42 and stator assembly 30. Thus, this eases the assembly as well as the placement of these parts within the motor. Also, the retainer 100 minimizes the axial movement of the shaft 42 in the stator 30 due to the enhanced position of the commutator 50 and rotor 44 within the stator assembly 30.

While the above detailed description describes the preferred embodiment of the present invention, the invention is susceptible to modification, variation, and alteration without deviating from the scope and fair meaning of the subjoined claims.

What is claimed is:

1. An electric DC motor, comprising:

a stator assembly;

an armature rotatable within said stator assembly;

a commutator rotatable with said armature and connected to said armature via a shaft, said commutator having an outer surface layer formed of titanium graphite material; and brushes associated with said commutator, said brushes held in an end plate and said brushes formed from a titanium graphite material.

2. The motor according to claim 1, wherein the titanium graphite material includes titanium, silicon and graphite.

3. The motor according to claim 2, wherein said titanium graphite material is $Ti_3SiC_2$.

4. The motor according to claim 1, wherein said titanium graphite material being self-lubricating.

5. A power tool, comprising:

a housing;

a stator assembly;

an armature rotatable within said stator assembly;

a commutator rotatable with said armature and connected to said armature via a shaft, said commutator having an outer surface layer formed of titanium graphite material; and brushes associated with said commutator, said brushes held in an end plate and said brushes formed from a titanium graphite material.

6. The motor according to claim 5, wherein the titanium graphite material includes titanium, silicon and graphite.

7. The motor according to claim 6, wherein said titanium graphite material is $Ti_3SiC_2$.

8. The motor according to claim 5, wherein said titanium graphite material being self-lubricating.

* * * * *